United States Patent [19]

Alexander et al.

[11] Patent Number: 4,724,511
[45] Date of Patent: Feb. 9, 1988

[54] DIELECTRIC COMPOSITIONS

[75] Inventors: John H. Alexander, Santa Barbara, Calif.; Dawn A. Jackson, Sawbridgeworth, England

[73] Assignee: ITT Industries, Inc., New York, N.Y.

[21] Appl. No.: 921,162

[22] Filed: Oct. 20, 1986

[30] Foreign Application Priority Data

Oct. 24, 1985 [GB] United Kingdom ............ 8526227

[51] Int. Cl.$^4$ .................. H01G 4/12; H01G 7/00; C04B 35/46
[52] U.S. Cl. .................. 361/321; 29/25.42; 252/521; 501/136
[58] Field of Search .......... 29/25.42; 264/61; 252/521; 361/328, 329, 320, 321; 501/134–136

[56] References Cited

U.S. PATENT DOCUMENTS

| | | | |
|---|---|---|---|
| 3,670,216 | 6/1972 | Masuyama et al. | 252/521 X |
| 4,160,748 | 7/1979 | Yodogawa et al. | 252/521 X |
| 4,338,403 | 7/1982 | Kawashima et al. | 501/136 |
| 4,482,935 | 11/1984 | Wheeler | 501/136 X |
| 4,490,318 | 12/1984 | Masuyama et al. | 264/61 |
| 4,506,026 | 3/1985 | Hodgkins et al. | 501/135 |
| 4,525,768 | 6/1985 | Wheeler | 252/521 X |
| 4,536,821 | 8/1985 | Wheeler et al. | 501/135 X |

FOREIGN PATENT DOCUMENTS

| | | | |
|---|---|---|---|
| 65999 | 6/1978 | Japan | 501/136 |
| 50510 | 4/1980 | Japan | 501/135 |
| 196504 | 11/1984 | Japan | 501/135 |

*Primary Examiner*—Donald A. Griffin
*Attorney, Agent, or Firm*—T. L. Peterson

[57] ABSTRACT

A dielectric composition comprising a base of non-stoichiometric lead magnesium niobate, non-stoichiometric lead zinc niobate, lead zirconate, titanium dioxide and bismuth titanate, together with a further oxide additive, in particular nickel oxide, manganese oxide, cobalt oxide or a rare earth, has a low firing temperature (900°–1000° C.), high dielectric constant (up to 14,750), low tan $\delta$(<2.5% at 20° C.) and Z5U temperature coefficient of capacitance.

12 Claims, No Drawings

DIELECTRIC COMPOSITIONS

FIELD OF THE INVENTION

This invention relates to dielectric compositions for use, for example, in ceramic capacitors in particular, but not exclusively, multilayer ceramic capacitors.

BACKGROUND OF THE INVENTION

A multilayer ceramic capacitor basically comprises a stack consisting of a plurality of dielectric members formed of a ceramic material, with electrodes positioned between the members. The electrodes may be screen-printed onto the ceramic material, in the unfired state thereof, using conductive inks. A stack of screen-printed dielectric members is assembled, pressed together, cut into individual components, if appropriate, and fired until sintering occurs, in order to reduce non-porosity.

With the originally employed dielectrics the capacitors had to be fired at temperatures of the order of 1200°-1400° C., which meant that the internal electrodes had to be of a suitable material to withstand such temperatures and that, therefore, expensive noble metals, such as platinum or palladium, had to be used. However, by suitable choice of the dielectric it is possible to reduce the firing temperature thus enabling the use of internal electrodes with a high silver content (50-100% silver), which reduces the cost of materials and manufacture. A dielectric composition which can be fired at a temperature between 950° C. and 1100° C. and can thus be used with high silver content electrodes is disclosed in our GB Patent Specification Serial No. 2107300B (J. M. Wheeler 1). The compositions disclosed therein comprise non-stoichiometric lead magnesium niobate ($PbMg_{\frac{1}{3}}Nb_{\frac{2}{3}}O_3$) with one or more of the following, namely lead titanate, lead stannate, lead zirconate. Some of these compositions have dielectric constants in the range 7500-10,000 which makes them particularly suitable for multilayer ceramic capacitors. The originally employed ceramics (U.S. coding Z5U) were not compatible with high silver content electrodes and usually had dielectric constants lower than 7500-10,000.

The electronics industry generally requires smaller components and smaller and cheaper capacitors can be obtained by producing dielectrics which have low firing temperatures so that they are compatible with high silver content electrodes and having even higher dielectric constants than those mentioned above. One such dielectric composition is disclosed in our GB Application No. 8405677 (Serial No. 2137187A) (J. M. Wheeler—D. A. Jackson 3-1X) and is based on non-stoichiometric lead magnesium niobate together with non-stoichiometric lead zinc niobate. This dielectric composition may also include one or more simple oxide additives chosen from silica, manganese dioxide, zinc oxide, nickel oxide, alumina, ceric oxide, lanthanium oxide, tungsten oxide, gallium oxide, titanium oxide and lead oxide. One or more of the following complex oxide additives may also be added to the basic composition, bismuth stannate, bismuth titanate, lead stannate, lead zirconate and lead titanate with or without a simple oxide additive. Such compositions fire at temperatures between 980° C. and 1075° C., have dielectric constants at 25° C. in the range of 9000 to 17,600 with Z5U temperature coefficient of capacitance characteristics and generally low tan $\delta$ (%) (dielectric loss) at 25° C.

It should be noted that the lead magnesium niobate employed in the above dielectric composition is non-stoichiometric and is not the conventional stoichiometric $PbMg_{\frac{1}{3}}Nb_{\frac{2}{3}}O_3$. In Patent Specification No. 2107300B the expression $PbMg_{\frac{1}{3}}Nb_{\frac{1}{3}}O_3$ was employed to distinguish from the conventional $PbMg_{\frac{1}{3}}Nb_{\frac{2}{3}}O_3$. The material employed for the results quoted in the above specifications is in fact $PbMg_{0.443}Nb_{0.5001}O_3$, which approximates to $PbMg_{\frac{1}{3}}Nb_{\frac{1}{3}}O_3$. Preferably the magnesium was in the range of 0.35 to 0.5 and the niobium was in the range 0.4 to 0.8 and thus the lead magnesium niobate was non-stoichiometric.

SUMMARY OF THE INVENTION

It is an object of the present invention to provide alternative dielectric compositions based on non-stoichiometric lead magnesium niobate together with non-stoichiometric lead zinc niobate with further improved properties, in particular reduced tan $\delta$.

According to one aspect of the present invention there is provided a dielectric composition comprising non-stoichiometric lead magnesium niobate, non-stoichiometric lead zinc niobate, lead zirconate, titanium dioxide and bismuth titanate, and including a further oxide additive.

According to another aspect of the present invention there is provided a dielectric composition including a small percentage of a rare earth serving to reduce the temperature coefficient of capacitance significantly.

According to a further aspect of the present invention there is provided a dielectric composition including a rare earth serving as a sintering aid.

According to yet another aspect of the present invention there is provided a multilayer ceramic capacitor including a plurality of layers of dielectric and a plurality of high silver content electrodes arranged between the dielectric layers, which dielectric layers are formed of non-stoichiometric lead magnesium niobate, non-stoichiometric lead zinc niobate, lead zirconate, titanium dioxide and bismuth titanate, and a further oxide additive selected from the group consisting of nickel oxide, manganese oxide, cobalt oxide and the rare earths.

According to yet a further aspect of the present invention there is provided a method of manufacturing a multilayer ceramic capacitor including the steps of screen-printing a plurality of electrodes onto each of a plurality of dielectric members, assembling a stack of the resultant screen-printed members, pressing the stack together, dividing the stack into individual capacitor components and firing the individual components, and wherein the dielectric comprises non-stoichiometric lead magnesium niobate, non-stoichiometric lead zinc niobate, lead zirconate, titanium dioxide and bismuth titanate, and a further oxide additive selected from the group consisting of nickel oxide, manganese oxide, cobalt oxide and the rare earths.

According to another aspect of the present invention there is provided a dielectric composition comprising non-stoichiometric lead magnesium niobate, non-stoichiometric lead zinc niobate and an oxide additive selected from the group consisting of cobalt oxide and the rare earths of praseodymium, neodymium, samarium, europium, gadolinium, terbium, dysprosium, holmium, erbium, ytterbium and yttrium.

DETAILED DESCRIPTION

One of the compositions disclosed in GB Application No. 8405677 comprises a base of non-stoichiometric lead magnesium niobate (LMN) and non-stoichiometric lead zinc niobate (LZN) together with the additions of three oxide additives, namely lead zirconate, bismuth titanate and titanium dioxide. The particular example quoted in Application No. 8405677 comprised a base of approximately 75% by weight LMN and 25% by weight LZN together with 4% by weight $PbZrO_3$, 0.8% by weight $Bi_2Ti_2O_7$ and 0.07% by weight $TiO_2$. When fired at 980° C. the resultant material had a dielectric constant of 17,600, temperature coefficients of capacitance (TCC) within the Z5U range (between 10° C. and 85° C. the capacitance variation is within +22% and −56% of the 25° C. value) at +8.9% and −51.7%, and tan δ of 2.9%. When fired at 1000° C., the dielectric constant was 15200, the TCC were +8.8% and −52.0% and tan δ was 2.6%. When fired at 1020° C., the dielectric constant was 15,800, the TCC were +8.3% and −52.2% and tan δ was 2.7%. For Z5U coding the tan δ values are required to be less than 2.5% when measured at 25° C., thus whilst this material is very acceptable in some respects, i.e. dielectric constant and TCC values, tan δ should ideally be lower. The Z5U is a U.S. coding and is not wholly equivalent to the UK coding 2F4 which specifies that tan δ at 20° C. is less than 2.5%. Since tan δ increases with decreasing temperature for these types of materials, further modification of this one composition referred to in Application No. 8405677 will be needed for it to fall within both US coding Z5U and UK coding 2FT.

The composition referred to is a relaxor dielectric, that is the dielectric constant decreases (relaxes) with increasing frequency. The proportions of the three oxide additives may differ from those quoted above without significantly affecting the properties. Another example of the composition comprises 4% by weight of $PbZrO_3$, 0.075% by weight of $TiO_2$ and 0.57% by weight of $Bi_2Ti_2O_7$ and may comprise 390 g LMN, 130 g LZN, 20.8 g $PbZrO_3$ (4% by weight of LMN and LZN together), 0.39 g $TiO_2$ (0.075% by weight of LMN and LZN together) and 2.97 g $Bi_2Ti_2O_7$ (0.55% by weight of LMN, LZN, $PbZrO_3$ and $TiO_2$ together).

In the following tables results are quoted for various oxide additives to the basic relaxor compound comprising LMN, LZN, $PbZrO_3$, $TiO_2$ and $Bi_2Ti_2O_7$ with the proportions as quoted in the preceding paragraph.

Table 1 indicates disc results obtained for simple oxide additions (% by weight). These additions were made by adding a nitrate solution of the appropriate material or by ball milling oxide into the basic compound. The samples were dried, pressed into discs and fired at 980° C. for two hours.

Table 2 indicates multilayer results for the basic compound and two NiO additions (% by weight) with various firing conditions. The additions being made as before.

Table 3 indicates disc results for the basic compound and various rare earth additions. The relevant amount of oxides were added to give the quoted percentage of metal additive, e.g. sufficient $La_2O_2$ was added to give 1 wt% La. All of the samples whose results are quoted in Table 3 were made by incorporating the appropriate oxides with the basic compound by ball milling, drying and then firing at 980° C. for two hours.

TABLE 1

| COMPOSITION | ΔC 10–85° C. REF. 25° C. + % | ΔC 10–85° C. REF. 25° C. − % | $\times 10^3_{max}$ K | $T_{Kmax}$ °C. | $T_{\delta max}$ °C. | $\times 10^3$ 20° C. K | $\times 10^3$ 25° C. K | $\tan\delta_{20}$ % | $\tan\delta_{25}$ % |
|---|---|---|---|---|---|---|---|---|---|
| BASIC RELAXOR COMPOUND | 5.2 | 52.3 | 14.6 | 18 | −3 to −1 | 14.6 | 13.9 | 2.25 | 0.9 |
| +0.1% by wt NiO | 7.8 | 52.2 | 14.7 | 19 | −4 | 14.6 | 13.6 | 2.7 | 0.6 |
| +0.25% by wt NiO | 9.2 | 52.2 | 13.8 | 18 | −10 to −5 | 13.8 | 12.6 | 2.4 | 0.5 |
| +0.5% by wt NiO | 9.6 | 52.0 | 14.1 | 17 | −10 to −8 | 14.1 | 12.9 | 2.1 | 0.4 |
| +0.75% by wt NiO | 11.5 | 52.3 | 14.0 | 15 to 16 | −10 to −5 | 13.9 | 12.6 | 2.0 | 0.55 |
| +1.0% by wt NiO | 13.2 | 51.9 | 13.0 | 12 to 15 | −20 to −7 | 12.7 | 11.5 | 1.4 | 0.3 |
| +0.01% by wt $MnO_2$ | 5.3 | 53.0 | 14.5 | 17 to 18 | −10 to −7 | 14.4 | 13.8 | 2.65 | 1.0 |
| +0.1% by wt $MnO_2$ | 5.45 | 47.0 | 12.2 | 14 to 15 | −20 | 11.9 | 11.5 | 1.05 | 0.5 |
| +1.0% by wt $MnO_2$ | 0.2 | 26.05 | 4.83 | 30 | 15–55 | 4.75 | 4.81 | 1.8 | 1.8 |
| +0.1% by wt CoO | 3.05 | 49.3 | 13.4 | 19 | −20 to −15 | 13.3 | 13.0 | 1.65 | 0.7 |
| +0.5% by wt CoO | 0 | 43.7 | 10.65 | 25 to 30 | −20 | 10.45 | 10.65 | 1.3 | 1.0 |
| +1.0% by wt CoO | 0.2 | 40.7 | 9.22 | 30 | −20 | 8.98 | 9.21 | 2.0 | 1.85 |
| +0.1% by wt $CeO_2$ | 7.1 | 51.9 | 13.9 | 16 | −15 | 13.7 | 13.0 | 1.8 | 0.7 |
| +0.5% by wt $CeO_2$ | 6.7 | 51.4 | 12.8 | 15 | −12 | 12.6 | 12.0 | 1.65 | 0.8 |
| +1.0% by wt $CeO_2$ | 6.1 | 50.0 | 12.1 | 14 to 16 | −15 to −10 | 11.9 | 11.4 | 1.55 | 0.8 |
| +0.1% by wt $La_2O_3$ | 8.7 | 53.9 | 14.2 | 12 to 13 | −10 to −9 | 13.7 | 13.05 | 1.25 | 0.65 |
| +0.5% by wt $La_2O_3$ | 15.9 | 49.8 | 11.2 | −9 to −6 | −30 | 9.18 | 8.72 | 0.2 | 0.2 |

TABLE 2

| COMPOSITION | FIRING CONDITIONS | ΔC 10–85° C. REF. 25° C. + % | ΔC 10–85° C. REF. 25° C. − % | $\times 10^3_{max}$ K | $T_{Kmax}$ °C. | $\times 10^3_{20}$ K | $\times 10^3_{25}$ K | $\tan\delta_{20}$ % | $\tan\delta_{25}$ % | INSULATION RESISTANCE KΩF |
|---|---|---|---|---|---|---|---|---|---|---|
| BASIC RELAXOR COMPOUND | 2 hr. 1000° C. Ramp 6° C. min$^{-1}$ | 2.7 | 50.8 | 16.9 | 17 to 20 | 16.9 | 16.6 | 3.55 | 2.25 | 12 to 30 |
| BASIC RELAXOR COMPOUND +1.0% NiO | 2 hr. 1000° C. Ramp 6° C. min$^{-1}$ | 10.0 | 55.4 | 16.3 | 8–10 | 15.2 | 14.7 | 1.2 | 0.9 | 22 to 32 |
|  | 2 hr. 1000° C. Ramp 3° C. min$^{-1}$ | 8.7 | 53.8 | 15.9 | 7–11 | 15.1 | 14.6 | 1.3 | 0.9 | 16 to 17 |
|  | 3 hr. 960° C. Ramp 4.1° C. min$^{-1}$ | 12.9 | 56.3 | 17.7 | 4–5 | 15.8 | 15.4 | 1.85 | 1.35 | 33 to 79 |
|  | 2 hr. 960° C. Ramp 3° C. min$^{-1}$ | 9.3 | 54.7 | 14.4 | 7–11 | 13.6 | 13.15 | 1.35 | 0.9 | 16 to 21 |
|  | 3 hr. 960° C. | 8.3 | 55.0 | 15.5 | 7–11 | 14.7 | 14.3 | 1.45 | 1.0 | 16 to 21 |

TABLE 2-continued

| COMPOSITION | FIRING CONDITIONS | ΔC 10-85° C. REF. 25° C. + % | ΔC 10-85° C. REF. 25° C. - % | $\times 10^3_{max}$ K | $T_{Kmax}$ °C. | $\times 10^3_{20}$ K | $\times 10^3_{25}$ K | $\tan\delta_{20}$ % | $\tan\delta_{25}$ % | INSULATION RESISTANCE KΩF |
|---|---|---|---|---|---|---|---|---|---|---|
| BASIC RELAXOR COMPOUND +0.7% NiO | Ramp 2.4° C. min$^{-1}$ 2 hr. 1000° C. | 8.7 | 54.8 | 14.5 | 10-12 | 13.8 | 13.25 | 1.8 | 1.25 | 8 to 18 |
| | Ramp 6° C. min$^{-1}$ 2 hr. 980° C. | 10.9 | 55.7 | 16.45 | 6-7 | 15.0 | 14.65 | 1.8 | 1.45 | 54 to 94 |
| | Ramp 3° C. min$^{-1}$ 2 hr. 980° C. | 8.0 | 53.3 | 15.9 | 9-13 | 15.35 | 14.7 | 1.6 | 1.05 | 6 to 14 |
| | Ramp 1.6° C. min$^{-1}$ 3 hr. 960° C. | 11.7 | 56.0 | 18.3 | 5-7 | 16.7 | 16.3 | 1.8 | 1.4 | 60 to 70 |
| | Ramp 4° C. min$^{-1}$ 2 hr. 960° C. Ramp 3° C. min$^{-1}$ | 8.4 | 54.9 | 16.25 | 10-12 | 15.5 | 15.05 | 1.5 | 1.05 | 19 to 21 |

TABLE 3

| COMPOSITION | DISC DIAMETER mm | ΔC 10-85° C. REF. 25° C. + % | ΔC 10-85° C. REF. 25° C. - % | $\times 10^3_{max}$ K | $T_{\delta max}$ °C. | $\times 10^3$ 20° C. °C. | $\times 10^3$ 25° C. K | $\tan\delta_{20}$ K | $\tan\delta_{25}$ % | % |
|---|---|---|---|---|---|---|---|---|---|---|
| BASIC RELAXOR COMPOUND | 6.37 | 4.3 | 54.4 | 14.8 | 17 to 19 | −3 to 0 | 14.8 | 14.2 | 2.6 | 1.1 |
| +1.0 wt % La | 6.08 | 16.7 | 43.7 | 6.80 | −30 to −20 | <−30 | 5.24 | 5.06 | 0.75 | 0.3 |
| +0.1 wt % La | 6.11 | 8.6 | 52.0 | 14.3 | 12 | −20 to −3 | 13.6 | 13.1 | 1.3 | 0.8 |
| +1.0 wt % Ce | 6.23 | 5.6 | 50.9 | 14.7 | 14 to 15 | −10 | 14.4 | 13.9 | 2.1 | 1.2 |
| +0.1 wt % Ce | 6.25 | 3.9 | 50.9 | 14.5 | 16 to 18 | 1 | 14.5 | 14.0 | 2.9 | 1.3 |
| +1.0 wt % Pr | 6.21 | 15.4 | 41.5 | 7.05 | <−30 | <−30 | 5.15 | 5.1 | 0.35 | 0.25 |
| +0.1 wt % Pr | 6.26 | 11.9 | 51.6 | 14.8 | 9 to 11 | −3 | 13.8 | 13.3 | 1.1 | 0.7 |
| +1.0 wt % Nd | 6.12 | 18.1 | 41.5 | 8.72 | <−30 | <−30 | 6.15 | 5.69 | 1.6 | 0.9 |
| +0.1 wt % Nd | 6.20 | 11.2 | 50.7 | 13.35 | 7 to 9 | −20 to −6 | 12.5 | 11.95 | 1.2 | 0.75 |
| +1.0 wt % Sm | 6.13 | 14.9 | 41.45 | 6.88 | <−30 | <−30 | 5.39 | 5.13 | 1.25 | 0.7 |
| +0.1 wt % Sm | 6.21 | 8.9 | 52.1 | 14.95 | 11 to 13 | −5 to 0 | 14.5 | 13.7 | 4.1 | 1.9 |
| +1.0 wt % Eu | 6.19 | 11.2 | 39.7 | 6.57 | −20 | <−30 | 5.20 | 5.0 | 0.65 | 0.65 |
| +0.1 wt % Eu | 6.11 | 8.9 | 52.6 | 13.8 | 10 to 12 | −10 | 13.05 | 12.45 | 1.65 | 0.9 |
| +1.0 wt % Gd | 6.23 | 12.55 | 41.5 | 7.80 | −10 | <−30 | 6.54 | 6.25 | 0.75 | 0.55 |
| +0.1 wt % Gd | 6.12 | 8.5 | 52.8 | 13.7 | 12 to 13 | −1 | 13.3 | 12.6 | 2.0 | 0.9 |
| +1.0 wt % Tb | 6.28 | 2.3 | 26.5 | 6.48 | 35 | −5 to −4 | 6.19 | 6.34 | 1.7 | 1.6 |
| +0.1 wt % Tb | 6.20 | 3.55 | 50.3 | 12.6 | 16 to 19 | −20 to −6 | 12.6 | 12.2 | 1.7 | 1.0 |
| +1.0 wt % Dy | 6.12 | 7.1 | 43.2 | 9.55 | 10 to 14 | −10 | 9.22 | 8.90 | 1.45 | 0.8 |
| +0.1 wt % Dy | 6.17 | 5.95 | 52.55 | 13.8 | 15 to 17 | −4 | 13.6 | 13.0 | 2.45 | 1.25 |
| +1.0 wt % Ho | 6.08 | 4.7 | 42.4 | 10.8 | 14 to 16 | −10 to −4 | 10.7 | 10.3 | 2.15 | 1.4 |
| +0.1 wt % Ho | 6.20 | 5.3 | 51.8 | 14.9 | 15 to 17 | −10 to −5 | 14.75 | 14.2 | 2.3 | 1.25 |
| +1.0 wt % Er | 6.06 | 3.85 | 42.45 | 10.7 | 16 to 18 | −5 to −4 | 10.7 | 10.3 | 2.8 | 1.45 |
| +0.1 wt % Er | 6.06 | 5.3 | 51.3 | 14.3 | 16 to 17 | −1 | 14.2 | 13.6 | 3.3 | 1.4 |
| +1.0 wt % Yb | 6.16 | 3.7 | 46.8 | 12.3 | 17 | −6 to −1 | 12.2 | 11.9 | 2.7 | 1.55 |
| +0.1 wt % Yb | 6.21 | 5.2 | 52.6 | 14.3 | 15 to 17 | −7 to −5 | 14.15 | 13.6 | 1.95 | 1.1 |
| +1.0 wt % Y | 6.07 | 3.3 | 35.4 | 7.51 | 13 to 19 | −10 to −4 | 7.47 | 7.26 | 2.55 | 1.35 |
| +0.1 wt % Y | 6.22 | 4.25 | 50.95 | 13.5 | 15 to 18 | −10 to −4 | 13.4 | 12.95 | 2.75 | 1.3 |

From the results quoted in Table 1 it is apparent that the simple oxide additives do not adversely affect the TCC results, all of the results being within the Z5U requirements, that whilst some do substantially reduce the dielectric constant, the majority do reduce tan δ. The tan δ results quoted for the rare earths $CeO_2$ and $La_2O_3$ being low, particularly for 0.5% $La_2O_3$ although there is an attendant drop in dielectric constant. The results quoted for NiO addition are also of interest. The lower percentages will not give 2F4 tan δ characteristics but with the higher proportions of 0.75% and 1.0%, reduction in tan δ without too great a decrease in dielectric constant is obtained. We have found that additions of NiO must be greater than 0.1% by weight. Table 2 quotes multilayer results for the basic compound, and 1.0% and 0.7% NiO additions for various firing conditions from which it is apparent that these compositions are particularly suitable for use in the manufacture of multilayer ceramic capacitors under a variety of firing conditions even as low as 960° C.

In view of the beneficial effect of the rare earths ceric oxide and lanthanum oxide, it was considered that other rare earths might produce similar effects and the compositions whose results are listed in Table 3 were tested. Again the TCC values are all still within the Z5U range.

It should be noted that some additions are particularly effective Curie peak flatteners, specifically 1% by weight of Terbium (Tb) or Yttrium (Y) although there is an attendant reduction in dielectric constant. Curie peak flattening is indicated if the $\Delta_c$ (TCC) value at 85° C. is less than that of the base compound. Whereas the Yttrium addition does not reduce tan δ it may be useful for modifying dielectrics with TCCs just outside the required specification. The TCC will be reduced with comparatively little reduction in dielectric constant. The results in Table 3 indicate that most of the rare earths do reduce tan δ values to some extent whilst flattening the Curie peak, and that in general 1 wt% reduces the dielectric constant by the order of 50% or more. The most useful rare earth additions appear to be Ytterbium (Yb) and Holmium (Ho) which at the 0.1 wt% level reduce tan δ and decrease TCC with little reduction in the ambient dielectric constant. The rare earth additions act as sintering aids as is indicated by the disc diameter results therefor being less than that of the basic relaxor compound and very nearly all of them are particularly good sintering aids as is indicated by the fact that the more the rare earth addition the smaller the diameter. In addition some have interesting effects as shifters for $T_{Kmax}$ and thus may be of use for modifying dielectrics.

Thus the invention provides dielectric compositions which fire at low temperatures (960° C. to 1000° C.) and are thus compatible with high silver content internal electrodes, have high dielectric constants (up to 16300 at 25° C. for 0.7 wt% NiO addition—16,700 at 20° C.), low tan δ at 20° and 25° C. (<2.5%) and Z5U temperature coefficients of capacitance.

A method of manufacturing a multilayer ceramic capacitor, using the dielectric composition of the Tables which include oxide additives to the basic relaxor compound, may comprise the steps of screen printing a plurality of electrodes on each of a plurality of unfired dielectric sheets with a high silver content ink; assembling a stack of such printed sheets with the electrodes of alternate layers arranged relative to one another as appropriate to the particular construction employed, for example sideways stepped; pressing the sheet together with extra blank ceramic sheets applied to the top and bottom of the stack if required; cutting the sheets to form individual capacitor components and firing the individual components at a temperature between 900° and 1000° C. Subsequently the electrodes between every other sheet may be connected in a conventional manner (end terminated) by the appropriate application of conductive paint, for example, to opposite end (side) faces of the stack.

Whilst specific reference has been made to the use of high silver content electrodes, the dielectric compositions of the present invention may be used with other electrode materials, such as platinum, palladium or gold.

Whilst specific mention has been made of multilayer capacitors, the dielectric compositions of the present invention can be used with other ceramic capacitor types.

Whilst the lowest quoted firing temperature in the tables is 960° C. it is considered that firing at lower temperatures, down to say 900° C., will produce comparable results.

What is claimed is:

1. A dielectric composition comprising non-stoichiometric lead magnesium niobate, non-stoichiometric lead zinc niobate, lead zirconate, titanium dioxide and bismuth titanate, and including a further oxide additive.

2. A dielectric composition as claimed in claim 1 wherein the further oxide additive is a simple oxide.

3. A dielectric composition as claimed in claim 2 wherein the further oxide additive is selected from the group consisting of nickel oxide, manganese oxide, cobalt oxide and the rare earths.

4. A dielectric composition as claimed in claim 1 wherein the further oxide additive is nickel oxide added at the 0.7% by weight level.

5. A dielectric composition as claimed in claim 1 wherein the lead magnesium niobate, the lead zinc niobate, the lead zirconate, the titanium dioxide and the bismuth titanate comprise a base material and the further oxide additive serves to reduce the dielectric loss (tan δ) of the base material without adversely affecting the dielectric constant (K) or the temperature coefficient of capacitance.

6. A dielectric composition as claimed in claim 5 wherein the further oxide additive is holmium or ytterbium at the 0.1 wt% level.

7. A dielectric composition including a rare earth serving as a sintering aid, wherein the rare earth is added to a base material comprising non-stoichiometric lead magnesium niobate, non-stoichiometric lead zinc niobate, lead zirconate, titanium dioxide and bismuth titanate.

8. A dielectric composition including a small percentage of a rare earth serving to reduce the temperature coefficient of capacitance significantly, wherein the rare earth is added to a base material comprising non-stoichiometric lead magnesium niobate, non-stoichiometric lead zinc niobate, lead zirconate, titanium dioxide and bismuth titanate.

9. A dielectric composition as claimed in claim 8, wherein the rare earth comprises yttrium or terbium at the 1 wt% level.

10. A multilayer ceramic capacitor including a plurality of layers of dielectric and a plurality of high silver content electrodes arranged between the dielectric layers, which dielectric layers are formed of non-stoichiometric lead magnesium niobate, non-stoichiometric lead zinc niobate, lead zirconate, titanium dioxide and bismuth titanate, and a further oxide additive selected from the group consisting of nickel oxide, manganese oxide, cobalt oxide and the rare earths.

11. A method of manufacturing a multilayer ceramic capacitor including the steps of screen-printing a plurality of electrodes onto each of a plurality of dielectric members, assembling a stack of the resultant screen-printed members, pressing the stack together, dividing the stack into individual capacitor components and firing the individual components, and wherein the dielectric comprises non-stoichiometric lead magnesium niobate, non-stoichiometric lead zinc niobate, lead zirconate, titanium dioxide and bismuth titanate, and a further oxide additive selected from the group consisting of nickel oxide, manganese oxide, cobalt oxide and the rare earths.

12. A dielectric composition comprising non-stoichiometric lead magnesium niobate, non-stoichiometric lead zinc niobate and an oxide additive selected from the group consisting of cobalt oxide and the rare earths of praseodymium, neodymium, samarium, europium, gadolinium, terbium, dysprosium, holmium, erbium, ytterbium and yttrium.

* * * * *

UNITED STATES PATENT AND TRADEMARK OFFICE
CERTIFICATE OF CORRECTION

PATENT NO. : 4,724,511

DATED : February 9, 1988

INVENTOR(S) : John Henry Alexander et al

It is certified that error appears in the above-identified patent and that said Letters Patent is hereby corrected as shown below:

Columns 3 and 4, the heading of Table 1 after "COMPOSITION" should read as follows:

| $\Delta C$ 10-85°C REF. 25°C | | $K_{max}$ | $TK_{max}$ | $T\delta_{max}$ | $K_{20°C}$ | $K_{25°C}$ | $\tan\delta_{20}$ | $\tan\delta_{25}$ |
|---|---|---|---|---|---|---|---|---|
| +% | -% | x $10^3$ | °C | °C | x $10^3$ | x $10^3$ | % | % |

Columns 3, 4, 5 and 6, the heading of of Table 2 after "FIRING CONDITIONS" should read as follows:

| $\Delta C$ 10-85°C REF. 25°C | | $K_{max}$ | $TK_{max}$ | $K_{20}$ | $K_{25}$ | $\tan\delta_{20}$ | $\tan\delta_{25}$ | INSULATION RESISTANCE |
|---|---|---|---|---|---|---|---|---|
| +% | -% | x $10^3$ | °C | x $10^3$ | x $10^3$ | % | % | K$\Omega$F |

Columns 5 and 6, the heading of Table 3 after "DISC DIAMETER mm" should read as follows:

| $\Delta C$ 10-85°C REF. 25°C | | $K_{max}$ | $TK_{max}$ | $T_{max}$ | $K_{20°C}$ | $K_{25°C}$ | $\tan\delta_{20}$ | $\tan\delta_{25}$ |
|---|---|---|---|---|---|---|---|---|
| +% | -% | x $10^3$ | °C | °C | x $10^3$ | x $10^3$ | % | % |

Signed and Sealed this

Twenty-seventh Day of February, 1990

*Attest:*

JEFFREY M. SAMUELS

*Attesting Officer*     *Acting Commissioner of Patents and Trademarks*